United States Patent
Luo et al.

(10) Patent No.: US 10,073,685 B2
(45) Date of Patent: Sep. 11, 2018

(54) METHODS OF SYSTEM OPTIMIZATION BY OVER-SAMPLING READ

(71) Applicant: SK hynix Inc., Gyeonggi-do OT (KR)

(72) Inventors: Gong Luo, Fremont, CA (US); Fan Zhang, Fremont, CA (US); Xiangyu Tang, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 172 days.

(21) Appl. No.: 15/000,614

(22) Filed: Jan. 19, 2016

(65) Prior Publication Data

US 2016/0210124 A1 Jul. 21, 2016

Related U.S. Application Data (60) Provisional application No. 62/105,058, filed on Jan. 19, 2015.

(51) Int. Cl.
*G06F 9/44* (2018.01)
*G06F 8/41* (2018.01)
*G06F 12/02* (2006.01)
*G06F 3/06* (2006.01)

(52) U.S. Cl.
CPC .......... *G06F 8/4434* (2013.01); *G06F 3/0619* (2013.01); *G06F 12/0246* (2013.01)

(58) Field of Classification Search
CPC ... G06F 8/4434; G06F 12/0246; G06F 3/0619
See application file for complete search history.

(56) References Cited

U.S. PATENT DOCUMENTS

| | | | | |
|---|---|---|---|---|
| 5,930,826 A * | 7/1999 | Lee | ......... | G11C 16/22 |
| | | | | 711/103 |
| 6,539,506 B1 * | 3/2003 | Lammers | ............. | G11C 29/44 |
| | | | | 714/704 |
| 8,902,652 B1 * | 12/2014 | Huang | ............. | G11C 11/5628 |
| | | | | 365/185.03 |
| 9,239,782 B2 * | 1/2016 | Yang | ............. | G06F 12/0246 |
| 9,983,808 B2 * | 5/2018 | Li | ............. | G06F 3/0619 |
| 2002/0136059 A1 * | 9/2002 | Moore | ............. | G11C 7/062 |
| | | | | 365/185.19 |
| 2006/0114588 A1 * | 6/2006 | Satoh | ............. | G06F 3/0619 |
| | | | | 360/48 |
| 2007/0174588 A1 * | 7/2007 | Fuin | ............. | G06F 8/4434 |
| | | | | 712/209 |
| 2010/0070681 A1 * | 3/2010 | Wan | ............. | G06F 12/0246 |
| | | | | 711/103 |
| 2010/0332735 A1 * | 12/2010 | Jung | ............. | G06F 12/0246 |
| | | | | 711/103 |
| 2011/0038205 A1 * | 2/2011 | Chou | ............. | G06F 11/1048 |
| | | | | 365/185.03 |
| 2012/0260349 A1 * | 10/2012 | Nagai | ............. | G06F 21/44 |
| | | | | 726/28 |

(Continued)

*Primary Examiner* — Ziaul A Chowdhury
(74) *Attorney, Agent, or Firm* — IP & T Group LLP (57) ABSTRACT

Methods for programming word lines in a block include identifying the block to be programmed, opening the block for programming, and programming a first word line in the block and a second word line in the block. The first word line and the second word line are separated by a number of word lines that are skipped during programming, and the number of word lines that are skipped being based on a predetermined interval.

14 Claims, 8 Drawing Sheets

(56) References Cited

U.S. PATENT DOCUMENTS

| | | | |
|---|---|---|---|
| 2013/0024608 A1* | 1/2013 | Hong | G06F 12/1081 |
| | | | 711/103 |
| 2013/0173875 A1* | 7/2013 | Kim | G06F 12/0246 |
| | | | 711/160 |
| 2013/0227200 A1* | 8/2013 | Cometti | G06F 12/0246 |
| | | | 711/103 |
| 2013/0262740 A1* | 10/2013 | Kim | G06F 12/0246 |
| | | | 711/102 |
| 2013/0329497 A1* | 12/2013 | Yoon | G11C 11/5628 |
| | | | 365/185.11 |
| 2014/0025887 A1 | 1/2014 | Kim et al. | |
| 2014/0115239 A1 | 4/2014 | Kong et al. | |
| 2015/0081952 A1* | 3/2015 | D'Abreu | G06F 12/0246 |
| | | | 711/103 |
| 2015/0143030 A1* | 5/2015 | Gorobets | G11C 11/5628 |
| | | | 711/103 |
| 2016/0011971 A1* | 1/2016 | Lee | G06F 12/0246 |
| | | | 711/103 |

\* cited by examiner

METHODS OF SYSTEM OPTIMIZATION BY OVER-SAMPLING READ

CROSS-REFERENCE TO RELATED APPLICATIONS

This application claims the benefit of U.S. Provisional Application 62/105,058 filed Jan. 19, 2015 entitled "REDUCING BIT ERROR RATES BY SELECTIVELY PROGRAMMING WORD LINES IN A BLOCK", the entire contents of which are incorporated herein by reference.

BACKGROUND

1. Field

Exemplary embodiments of the present disclosure relate to a signal processing and coding technique.

2. Description of the Related Art

Magnetic storage technology was most commonly used for storing data, but the lower weight and faster read/write operations requirements for current electronic devices make the magnetic storage technology less desirable. The NAND based technology is able to fulfill the demand for high density data storage devices but this technology is costly. There exists a need to lower the cost of NAND-based technology while maintaining performance levels.

SUMMARY

Aspects of the invention include methods for programming word lines in a block. The methods may include identifying the block to be programmed, opening the block for programming, and programming a first word line in the block and a second word line in the block, wherein the first word line and the second word line are separated by a number of word lines that are skipped during programming, the number of word lines that are skipped being based on a predetermined interval.

Further aspects of the invention include systems for programming word lines in a block. The systems may include controller suitable for identifying the block to be programmed, opening the block for programming, and programming a first word line in the block and a second word line in the block, wherein the first word line and the second word line are separated by a number of word lines that are skipped during programming, the number of word lines that are skipped being based on a predetermined interval.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Figure 1:
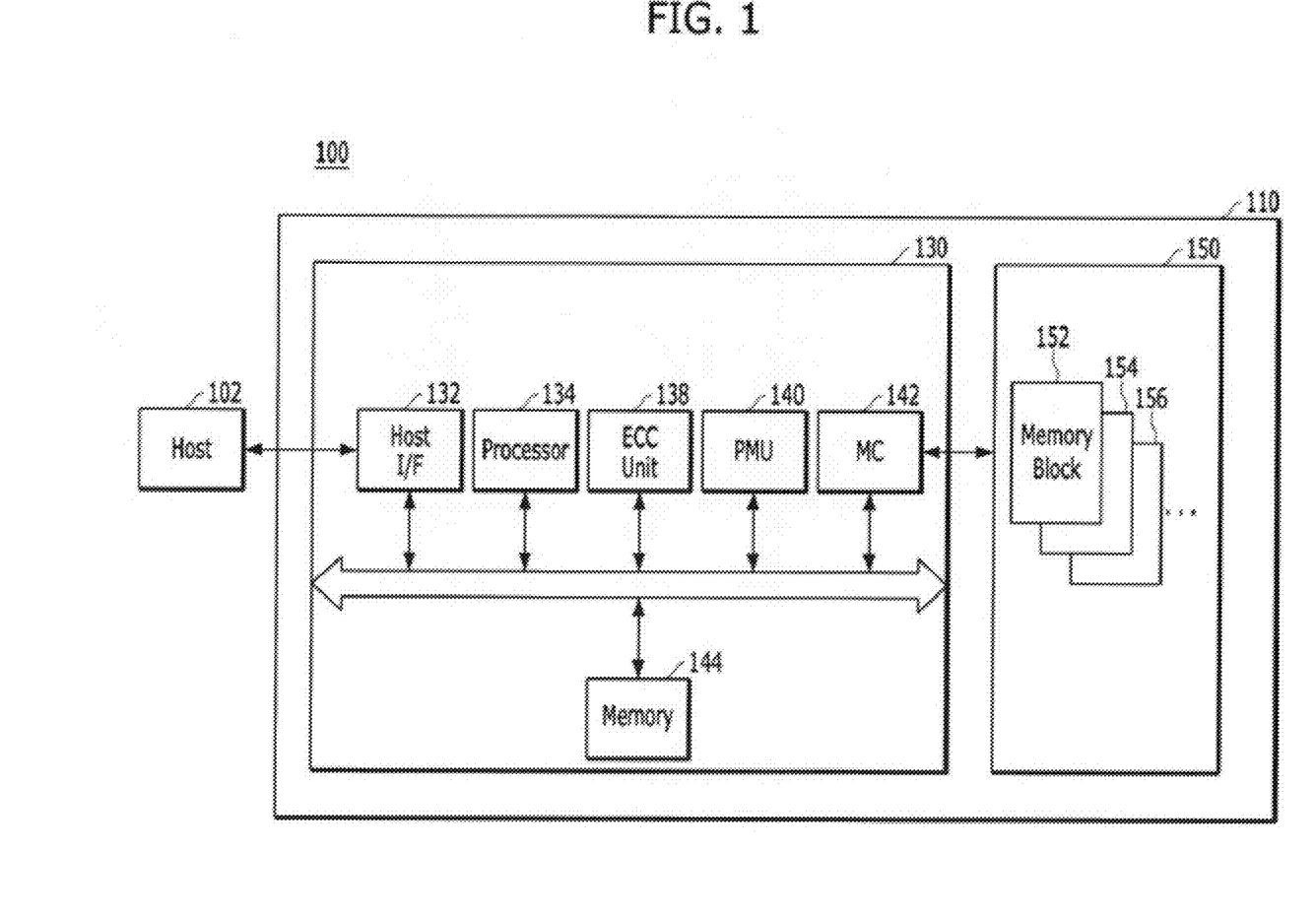
FIG. 1 is a diagram of a memory system in accordance with aspects of the invention.

In some embodiments, the present invention will be applied to a data processing system shown in FIG. 1.

FIG. 1 illustrates a data processing system 100 including a memory system in which embodiments of the present invention are applied. The data processing system 100 shown in FIG. 1 is for illustration only. Other constructions of the data processing system 100 could be used without departing from the scope of this disclosure. Although FIG. 1 illustrates one example of the data processing system 100, various changes may be made to FIG. 1. For example, the data processing system 100 may include any of elements, or may not include any of elements in any suitable arrangement.

Referring to FIG. 1, the data processing system 100 may include a host 102 and a memory system 110.

The host 102 may include, for example, a portable electronic device such as a mobile phone, an MP3 player and a laptop computer or an electronic device such as a desktop computer, a game player, a TV and a projector.

The memory system 110 may operate in response to a request from the host 102, and in particular, store data to be accessed by the host 102. In other words, the memory system 110 may be used as a main memory system or an auxiliary memory system of the host 102. The memory system 110 may be implemented with any one of various kinds of storage devices, according to the protocol of a host interface to be electrically coupled with the host 102. The memory system 110 may be implemented with any one of various kinds of storage devices such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices for the memory system 110 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 may include a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device and configure a memory card. The controller 130 and the memory device 150 may be integrated into one semiconductor device and configure a memory card such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

For another instance, the memory system 110 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted and, in particular, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a non-volatile memory device, for example, a flash memory. The flash memory may have a three-dimensional (3D) stack structure.

The controller 130 of the memory system 110 may control the memory device 150 in response to a request from the host 102. The controller 130 may provide the data read from the memory device 150, to the host 102, and store the data provided from the host 102 into the memory device 150. To this end, the controller 130 may control overall operations of the memory device 150, such as read, write, program and erase operations.

In detail, the controller 130 may include a host interface unit 132, a processor 134, an error correction code (ECC) unit 138, a power management unit (PMU) 140, a memory controller (MC) 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The MC 142 may serve as a memory interface between the controller 130 and the memory device 150 to allow the controller 130 to control the memory device 150 in response to a request from the host 102. The MC 142 may generate control signals for the memory device 150 and process data under the control of the processor 134. When the memory device 150 is a flash memory such as a NAND flash memory, the MC 142 may generate control signals for the NAND flash memory 150 and process data under the control of the processor 134.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 110, and thus reliable bad block management is required.

Figure 2:
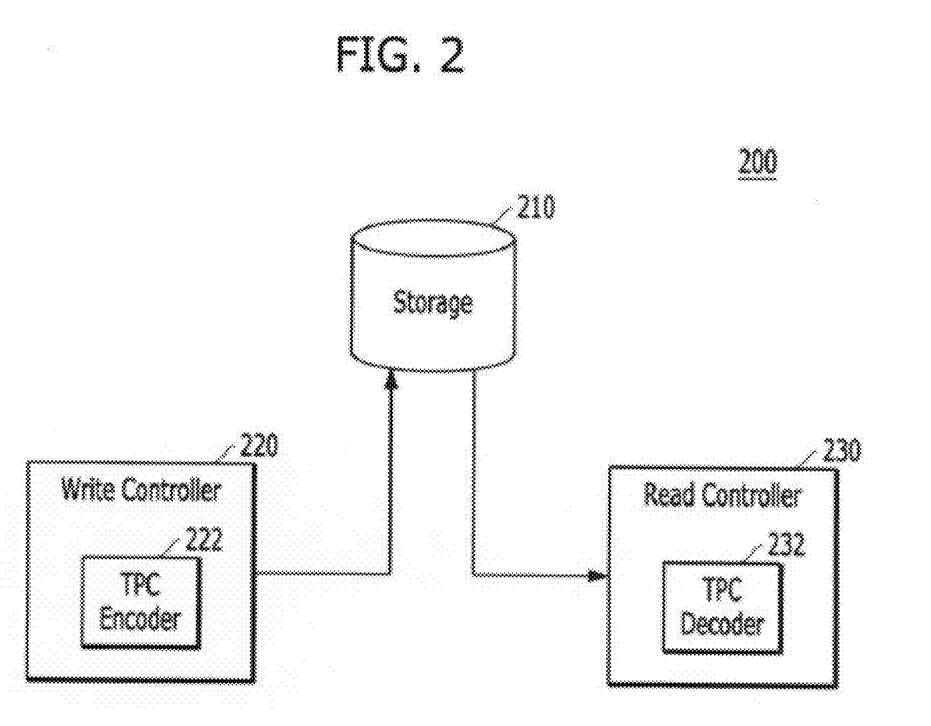
FIG. 2 is a diagram of memory system components according to aspects of the invention.

FIG. 2 is a block diagram of a memory system 200 including an encoder and a decoder in accordance with embodiments of the present invention. For example, the memory system 200 corresponds to the memory system 110 shown in FIG. 1. For clarity, components of FIG. 1 which are directly related to embodiments of the present invention are not shown herein.

Referring to FIG. 2, the memory system 200 includes a storage 210, a write controller 220 and a read controller 230. For example, the storage 210 corresponds to the memory device 150 shown in FIG. 1, and the write controller 220 and the read controller 230 correspond to the ECC unit 138 shown in FIG. 1.

The storage 210 may include solid state storage such as NAND flash. The write controller 220 receives data from host 102 in FIG. 1, and processes the data on the storage 210. The read controller 230 reads the data on the storage 210, and processes the data. The write controller 220 includes a TPC encoder 222 and the read controller 230 include a TPC decoder 232 as the components for the TPC scheme, respectively.

NAND flash memories are increasingly gaining applications in both enterprise and consumer data storage solutions. They are resilient to shock and their I/O performance is better than that of hard disk drives. A NAND flash memory is divided into many blocks and each block has many word-lines (WL). A WL can contain multiple pages. A page contains multiple logic block addresses (LBAs), which are the smallest memory unit that can be accessed by the host device. Unlike magnetic storage drives, NAND flash memories do not support in-place updates. That is, when data associated with a LBA is to be over-written with new data, its present location in the page is simply marked as "invalid" and the new data is written to a new location in another page.

Over time, many LBAs in a block will gradually become invalid. To reclaim the invalid locations in the block, the data associated with the remaining valid LBAs is read and written into another block, thus opening the entire block for erasure and subsequent writing with new data. This reclaiming process is termed "garbage collection". When a solid-state drive (SSD) runs out of empty blocks to write new data, a new write request will result in garbage collection being done to create empty blocks. Therefore, writing new data into the drive could cause several write operations to occur: the host write itself, and the writes during garbage collection.

Write amplification (WA) is defined as the ratio of the total number of writes to the NAND to the number of host writes. For example, if the host writes 1 LBA to the SSD and in the process caused garbage collection to conduct 1 extra write, the WA would be 2. Reducing write amplification is an important goal of NAND flash management.

Programming a WL in a block will cause disturbance to its neighboring WLs.

Another goal of NAND management is controlling the wear-level of blocks in the drive. A block can only tolerate a certain number of program/erase (P/E) cycles. When this number has been reached, the block is considered bad and cannot be used. Furthermore, the progressive incremental step pulse program value for the entire drive is changed by the blocks with the highest P/E cycle value currently. Thus, ensuring that the blocks have similar wear-levels throughout the SSD's lifetime is vital.

Data that are frequently written or updated are considered hot. Data that are infrequently or never updated after being initially written are considered cold. Data temperature (hot/cold) also exhibits temporal locality. That is, data written around the same time usually have similar temperatures. To reduce WA, hot and cold should be separated into different blocks and not be mixed into the same block. This can be done through many techniques such as using some of the blocks as cache.

Figure 3A:
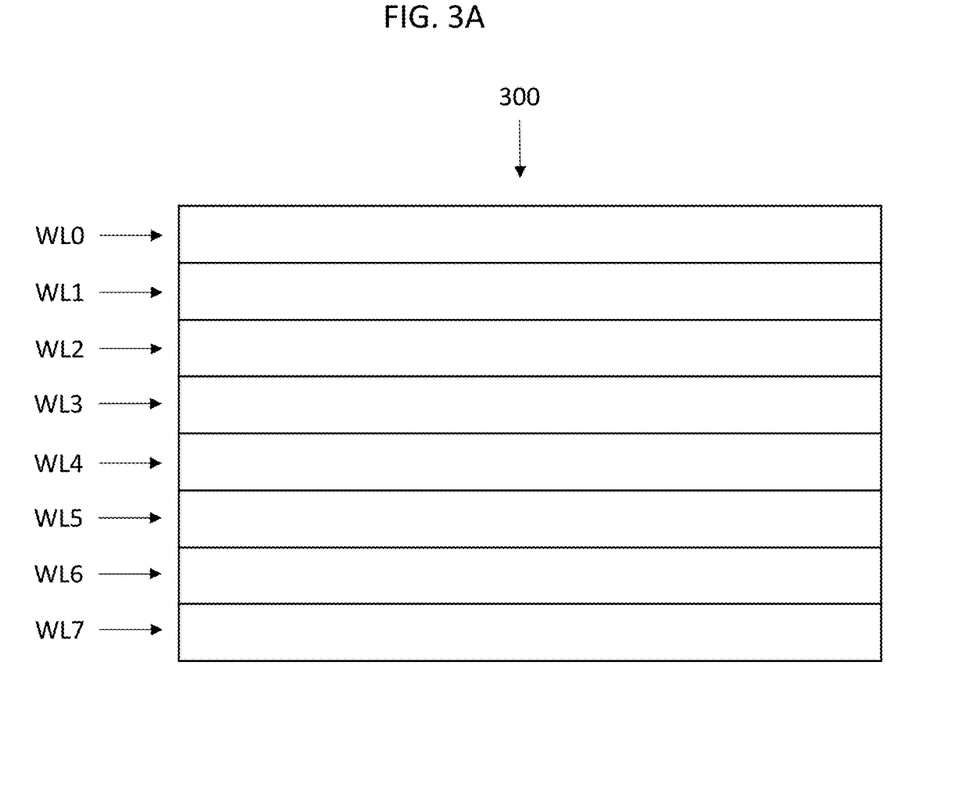
FIGS. 3A and 3B are diagrams of memory blocks in accordance with aspects of the invention.
Figure 3B:
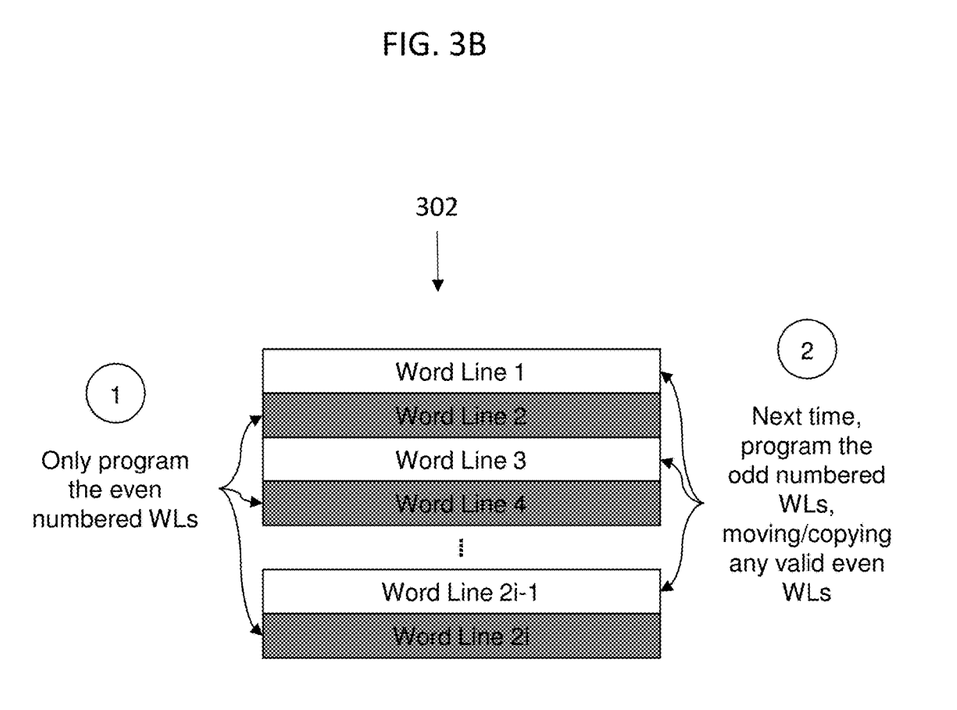
Figure 4:
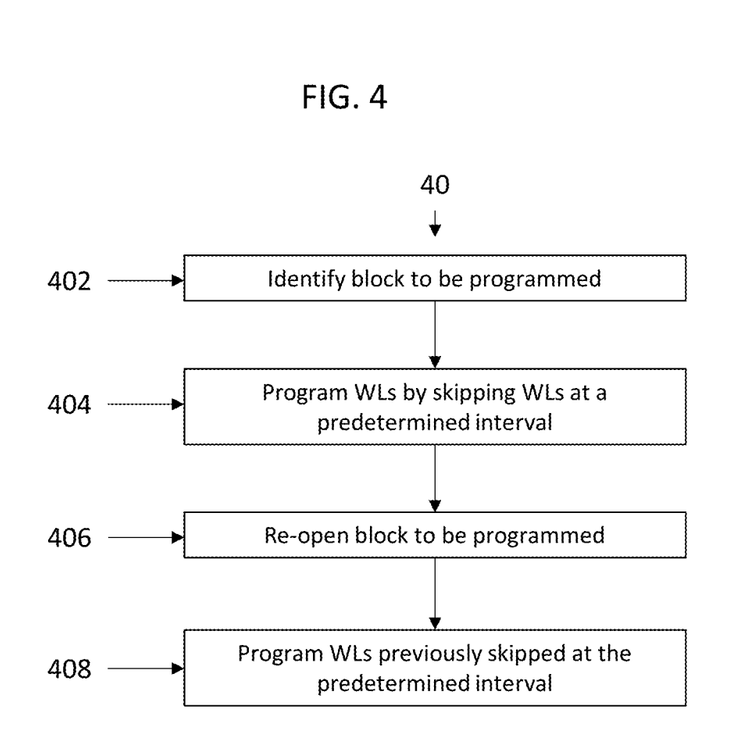
FIG. 4 is a flowchart of steps for programming word lines according to aspects of the invention.

FIGS. 3A and 3B are diagrams representing a memory block 300 in accordance with aspects of the invention. FIG. 4 is a flowchart 40 of steps in a process in accordance with aspects of the invention.

Referring to FIGS. 3A, 3B, and 4, an embodiment of a WL programming technique is disclosed herein that reduces program interference between the WLs.

Due to spatial and temporal locality in user traffic, the LBAs will have different write frequencies. If data separation and/or caching is used to reduce WA, some blocks in the SSD drive will be designated as hot or cache blocks and will be used to store hot LBAs. The LBAs in the hot blocks will be invalided frequently. This arrangement may be used to reduce the programming interference between neighboring WLs.

At step 402, a block is identified to be programmed. For example, the block may be similar to block 300 and/or block 302. Block 300 includes word lines WL0-WL7. Block 302 includes word lines 1-2i. In an embodiment, blocks 300 and 302 may store hot data.

At step 404, WLs are programmed by skipping WLs at a predetermined interval. For example, after a block is opened for programming, the even numbered word lines may be programmed (WL0, WL2, WL4, and WL6). Since the odd numbered WLs contain no valid data, interference between neighboring WLs is of lesser concern. Once the even numbered WLs are programmed, the block may be closed for programming.

At step 406, the block is re-opened to be programmed. When this block (e.g., blocks 300, 302) is opened for programming the next time, at step 408, the WLs that were previously skipped at the predetermined interval are programmed. For example, word lines WL1, WL3, WL5, and WL7 are programmed. The LBAs stored in the even WLs are most likely invalidated because, in this embodiment, blocks 300 and 302 may store hot data. The few LBAs that are not invalidated can be copied to another block prior to the block being opened. This again reduces the error generated by programming interference of neighboring WLs.

It is contemplated that various predetermined intervals may be used to effectuate the invention. As described above, in the case of an even/odd structure, the predetermined interval would be 1. In other words, the memory may skip 1 word line in-between the WLs of the block. Thus, in block 300, WL0 would be programmed, then WL1 would be skipped, and then WL2 would be programmed. WL0 and WL2 are separated by one word line, which is based on the predetermined interval. In other examples, every time the block is opened for programming, only every other nth WL to reduce interference between the WLs would be programmed. The predetermined interval may be set to various values depending on the size and structure of the blocks storing the data (e.g., 2, 3, 4 . . . n, etc.).

In additional applications, aside from being applied to hot/cache data blocks, the programming methods disclosed herein can also be applied to FTL table journaling blocks.

Figure 5:
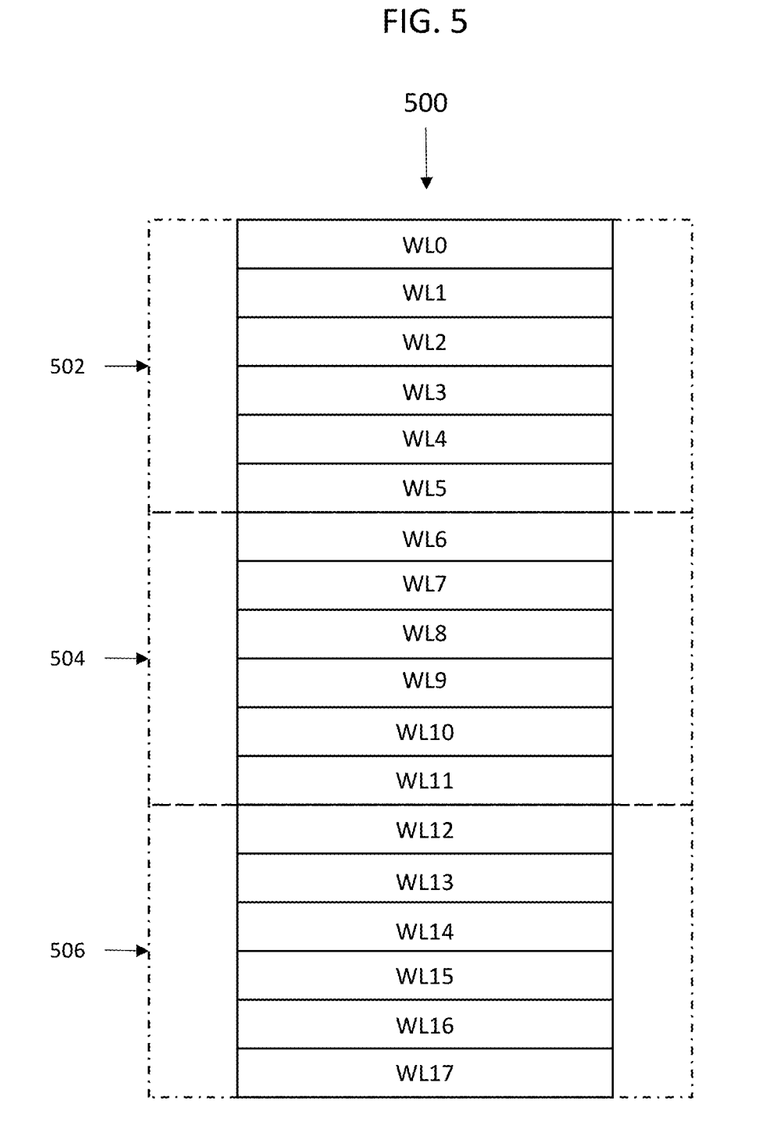
FIG. 5 is a diagram of a memory block in accordance with aspects of the invention.

Referring to FIG. 5, a diagram of a memory block 500 is shown. The WLs in the block 500 containing hot data may be divided into groups where each group contains n consecutive word lines. For example, group 502 contains six word lines (WL0-WL5), group 504 contains six word lines (WL6-WL11) and block 506 contains six word lines (WL12-WL17). In some embodiments, the $i^{th}$ (i=0, . . . , n−1) time the block is opened for writing, only the $i^{th}$ WL in each group is used. For example, if i=4, then only WL3, WL9, and WL15 would be used for programming. In some examples, before a hot block is opened for writing, any valid LBAs are garbage collected to ensure no valid data is present in the block.

Figure 6:
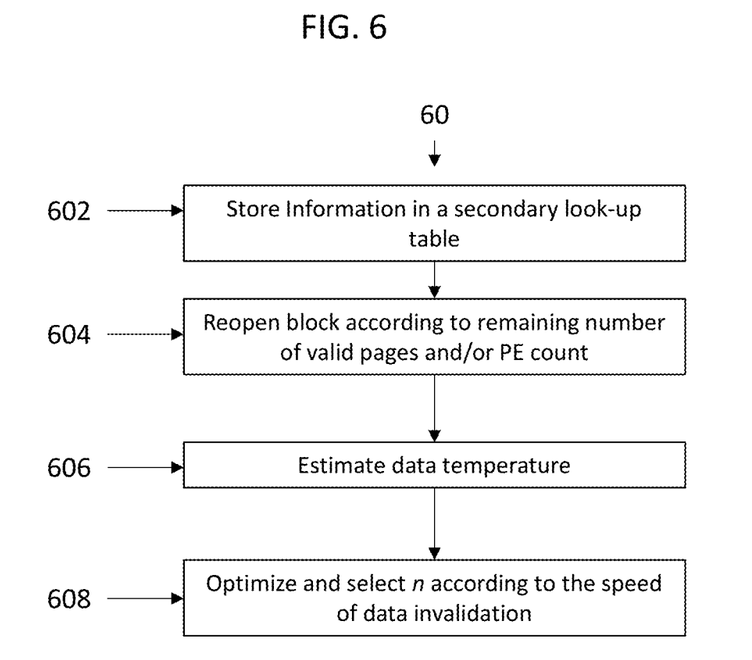
FIG. 6 is a flowchart of steps in a method for using a secondary lookup table according to aspects of the invention.

In some embodiments, since blocks in a drive may have different capacities, the FTL needs to be modified. Referring to FIG. 6, a flowchart 60 of steps for using a secondary lookup table is shown according to aspects of the invention. A secondary lookup table may be used to determine which WLs in the hot blocks are currently being used.

At step 602, information is stored in a secondary lookup table. The information may be either written into the meta-page when a block is closed, or may be stored in the firmware system area. Leaving unused spaces in a closed block effectively reduces the OP.

At step 604, a block is re-opened according to the remaining number of valid pages and/or PE count. In order to minimize WA increment and balance the WL, the FTL re-opens a certain block for write according to its remaining number of valid pages and PE count.

At step 606, data temperature of a block is estimated and at step 608, a predetermined interval n is optimized and selected according to the speed of data invalidation. The FTL also can estimate the temperature of the data so that n can be optimized for blocks with different data temperature. In some embodiments, n is chosen according to the speed of data invalidation so that most of the data are invalid when the block is reopened. For example, for blocks holding extremely hot data, a small value of n may be chosen.

Figure 7:
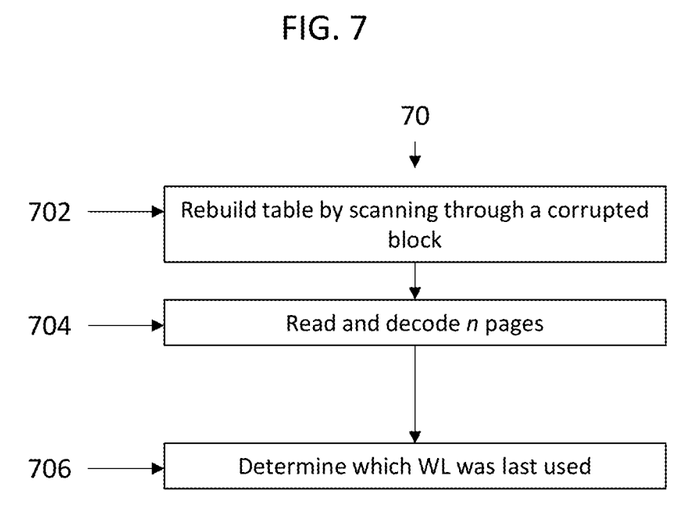
FIG. 7 is a flowchart of steps in a method for sudden power loss recovery in accordance with aspects of the invention.

A sudden power loss recovery (SPOR) procedure may also be modified to accommodate the disclosed programming techniques. Referring to FIG. 7, a flowchart 70 of steps for performing a SPOR is shown in accordance with aspects of the invention.

When a block is full, the P2L information is written into a (or multiple) meta-page for power-up recovery of the FTL table. When sudden power loss happens, there is no time to write the meta-page, so that all pages need to be read and decoded in order to rebuild the FTL table at next power up. With the programming technique disclosed herein, the whole block is conceptually divided into n sub-blocks, where only one of them is allowed to be written each time a block is opened. When a sub-block is full and the whole block is closed, a meta-page is written to the block for FTL table rebuild at next power-up.

At step 702, a table is rebuilt by scanning through a corrupted block. When sudden power loss happens, a table rebuild process scans through the corrupted block.

At step 704, n pages are read and decoded, and at step 706, the WL that was last used is determined. After reading and decoding the first n pages, the WL (modulo n) that was used previously can be determined, so that reading and decoding all remaining pages is not necessary. Instead, only the WLs which are possible for use when power loss happens need to be read and decoded (a total of N/n pages in a worst case). This advantageously shortens SPOR time significantly.

While the present invention has been particularly shown and described with reference to exemplary embodiments thereof, it will be understood by those of ordinary skill in the art that various changes in form and details may be made therein without departing from the spirit and scope of the present invention as defined by the following claims. Thus, the foregoing is by way of example only and is not intended to be limiting. For example, any numbers of elements illustrated and described herein are by way of example only. The present invention is limited only as defined in the following claims and equivalents thereof.

What is claimed is:

1. A method for programming word lines in a block in a memory system including a memory storage and a controller coupled with the memory storage, wherein the memory storage has multiple blocks, and each of the blocks has multiple word lines, the method comprising:
   identifying the block to be programmed by the controller, opening the block for programming,
   selecting a first word line in the block and a second word line in the block, and
   programming the first word line and the second word line in a same programming operation, wherein the first word line and the second word line are separated by a number of word lines, the number of word lines are skipped and not programmed during programming based on a predetermined interval of word lines,
   wherein the block is divided into a plurality of groups, each group including an amount of consecutive word lines, the amount being based on the predetermined interval, and
   wherein the predetermined interval is based on an i-th time the block is opened for writing.

2. The method of claim 1, wherein the opening the block for programming includes opening the block for storing hot data.

3. The method of claim 2, further comprising determining the predetermined interval based on speed of data invalidation of the block.

4. The method of claim 1, further comprising,
   re-opening the block to be programmed, and
   programming the number of word lines that were skipped.

5. The method of claim 1, wherein the block is identified based on at least one of a number of remaining valid pages and program erase count.

6. The method of claim 1, further comprising determining used word lines in the block with a secondary look-up table.

7. The method of claim 1, wherein each word line in the block that is programmed is separated by the number of word lines that are skipped during programming.

8. A system for programming word lines in a block, comprising:
- a memory storage including multiple blocks, wherein each of the blocks has multiple word lines;
- a controller coupled with the memory storage, wherein the controller is configured to
  - identify the block to be programmed,
  - open the block for programming, selecting a first word line in the block and a second word line in the block, and
  - programming the first word line and the second word line in a same programming operation, wherein the first word line and the second word line are separated by a number of word lines, the number of word lines are skipped and not programmed during programming based on a predetermined interval of word lines,
  - wherein the block is divided into a plurality of groups, each group including an amount of consecutive word lines, the amount of consecutive word lines being based on the predetermined interval, and
  - wherein the predetermined interval is based on an i-th time the block is opened for writing.

9. The system of claim 8, wherein the block stores hot data.

10. The system of claim 9, wherein the controller is further configured to determine the predetermined interval based on speed of data invalidation of the block.

11. The system of claim 8, wherein the controller is further configured to
- reopen the block to be programmed, and
- program the number of word lines that are skipped during a previous programming.

12. The system of claim 8, wherein the block is identified based on at least one of a number of remaining valid pages and program erase count.

13. The system of claim 8, wherein the controller is further configured to determine used word lines in the block with a secondary look-up table.

14. The system of claim 8, wherein each word line in the block that is programmed is separated by the number of word lines that are skipped during programming.

* * * * *